United States Patent
Szuszczewicz (10) Patent No.: US 7,689,909 B1
(45) Date of Patent: Mar. 30, 2010

(54) SYSTEM AND METHOD FOR GENERATING PHOTO COLLAGES AND PHOTO ALBUM PAGES

(76) Inventor: Edward P. Szuszczewicz, 3759 Penderwood Dr., Fairfax, VA (US) 22033

( * ) Notice: Subject to any disclaimer, the term of this patent is extended or adjusted under 35 U.S.C. 154(b) by 82 days.

(21) Appl. No.: 10/721,865

(22) Filed: Nov. 26, 2003

(51) Int. Cl.
*G06F 17/00* (2006.01)
(52) U.S. Cl. .................. 715/243; 715/204; 715/792
(58) Field of Classification Search ........... 715/517, 715/243, 204, 792
See application file for complete search history.

(56) References Cited

U.S. PATENT DOCUMENTS

| | | | |
|---|---|---|---|
| 5,563,722 A | 10/1996 | Norris | |
| 5,745,664 A | 4/1998 | Nomura et al. | |
| 5,815,645 A | 9/1998 | Fredlund et al. | |
| 5,864,411 A | 1/1999 | Norris | |
| 5,867,282 A | 2/1999 | Fredlund et al. | |
| 6,097,389 A * | 8/2000 | Morris et al. | 715/804 |
| 6,111,586 A | 8/2000 | Ikeda et al. | |
| 6,123,362 A | 9/2000 | Squilla et al. | |
| 6,147,768 A | 11/2000 | Norris | |
| 6,222,637 B1 | 4/2001 | Ito et al. | |
| 6,288,719 B1 | 9/2001 | Squilla et al. | |
| 6,301,586 B1 * | 10/2001 | Yang et al. | 707/104.1 |
| 6,324,545 B1 | 11/2001 | Morag | |
| 6,362,900 B1 | 3/2002 | Squilla et al. | |
| 6,373,591 B1 | 4/2002 | Seaman et al. | |
| 6,389,181 B2 | 5/2002 | Shaffer et al. | |
| 6,396,963 B2 | 5/2002 | Shaffer et al. | |
| 6,434,579 B1 | 8/2002 | Shaffer et al. | |
| 6,449,761 B1 * | 9/2002 | Greidinger et al. | 716/11 |
| 6,567,983 B1 | 5/2003 | Shiimori | |
| 6,771,801 B1 * | 8/2004 | Fisher et al. | 382/112 |
| 6,784,925 B1 * | 8/2004 | Tomat et al. | 348/207.11 |
| 6,964,025 B2 * | 11/2005 | Angiulo et al. | 715/838 |
| 7,148,990 B2 * | 12/2006 | Atkins et al. | 358/1.18 |
| 2001/0035875 A1 | 11/2001 | Suzuki et al. | |
| 2002/0040375 A1 * | 4/2002 | Simon et al. | 707/517 |
| 2002/0073121 A1 * | 6/2002 | Sano et al. | 707/517 |
| 2002/0097259 A1 | 7/2002 | Marshall et al. | |
| 2002/0122067 A1 | 9/2002 | Geigel et al. | |
| 2002/0154147 A1 | 10/2002 | Battles | |
| 2003/0051207 A1 | 3/2003 | Kobayashi et al. | |
| 2003/0058256 A1 | 3/2003 | Tanaka | |
| 2003/0072486 A1 | 4/2003 | Loui et al. | |
| 2003/0090498 A1 | 5/2003 | Schick et al. | |

OTHER PUBLICATIONS

Screen shots of Microsoft Word 2000, copyright 1983-1999, p. 1-15.*

"Sams Teach Yourself Adobe® Photoshop® 7 in 24 Hours", Rose, Published Apr. 2002 by Sams, printed from Safari Books Online, http://proquest.safaribooksonline.com/0672323885, p. 1-3.*

Welcome to Creative Memories (www.creativememories.com).

(Continued)

*Primary Examiner*—Amelia Rutledge
(74) *Attorney, Agent, or Firm*—Duane S. Kobayashi (57) ABSTRACT

A system and method that enables a user to efficiently manage graphical information is disclosed. In one embodiment, tools are provided that enable a user to creatively assemble, chronicle and modify photo album pages having a variety of graphical elements.

5 Claims, 6 Drawing Sheets

OTHER PUBLICATIONS

Microsoft Publisher, Publisher 2003 Overview (www.microsoft.com).
Creative Scrapbooking (www.dogbyte.com).
Print Shop Pro Publisher (www.broderbund.com).
Scrapbook Factory Deluxe (www.novadevelopment.com).
Hallmark Card Studio Deluxe (www.hallmark.com).
Photosuite Platinum Edition (www.roxio.com).
Ulead Photo Explorer (www.ulead.com).
ArcSoft PhotoImpression (www.arcsoft.com).
Picture It! (www.microsoft.com).
iPhoto (www.apple.com).
Microsoft PowerPoint X for Mac Service Release I, 2001.

* cited by examiner

SYSTEM AND METHOD FOR GENERATING PHOTO COLLAGES AND PHOTO ALBUM PAGES

BACKGROUND

Field of the Invention

The present invention relates generally to graphical editing systems and more particularly to photography, photo-journaling, and scrapbook and photo album page construction.

INTRODUCTION

It has been the nature of humankind to establish a lasting record of the times, the people and the events that manifested the culture, thoughts, desires, experiences, and technologies of an era. Witness, for example, the inscriptions and art forms in the hieroglyphics of the Egyptian Empire and in the carvings on the walls of the cliff dwellings of early native-American Indians. With varying venues these records have historical, educational, and personal value, and manifest the skill sets of artists, sculptors, engravers, and artisans in general.

Since the invention of the photographic imaging technique in the early 1800s, photography and photographic images have played an ever-increasing role in chronicling people, events and life styles—with the camera and photos having become the tools of choice for the largest part of humankind. With the price of cameras, film, and film processing finding its way into virtually everyone's budget, the proliferation of photos has given rise to its own information glut, with the associated technologies for storing, archiving, displaying, and journaling the photographic images markedly lagging behind the technology developments in cameras and in the photographic process itself. As a result, personal photos—with all their qualities in color and resolution, and their immeasurable personal value—all too often pass through an initial round of show-and-tell with friends, family members and associates, and end up in a drawer or stored in a box. This result is not from lack of interest, but rather a lack of time and appropriate user-friendly technologies to archive, display and journal the photos in a way fitting their role in documenting life.

The need for easier and faster techniques for archiving, displaying and journaling has grown more critical with the burgeoning market in digital cameras and the hastening pace of society. People now take more pictures than ever before. And with this new capability comes an increased workload that is simply a function of scale.

To appreciate the increased volume in pictures, one need only compare the conventional analog film approach of 12, 24 or 36 pictures per roll of film with the storage (i.e., memory) capacity of a digital camera. Typical "starter" memories (i.e., the memory provided with a newly purchased camera) begin at 4 MB, scaling up from there to 16, 32, 64, 128 MB, and higher. At 4 MB, a photographer can take approximately 60 pictures with a 640×480 pixel resolution using JPEG compression. And with a 64 MB memory, one can take approximately 900 pictures before needing to "reload" the camera.

What is needed therefore are tools that enable a user to cope with the volume of photos in a quick, easy and creative manner that leverages existing skill sets for purposes of documenting, recording, archiving and displaying the photos.

SUMMARY

The principles of the present invention satisfy the above-mentioned needs by providing a tool that enables a user to efficiently manage graphical information. In one embodiment, tools are provided that enable a user to creatively assemble, chronicle and modify photo album pages having a variety of graphical elements.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Various aspects of the present invention described below enable a user to realize that a photo-album page or photo-collage can be created quickly, easily, and artistically in a manner heretofore unforeseen for a personal computer with minimal system requirements and for a user with novice-level computer skills. The quickness and ease results from the construction, organization, and implementation of appropriate tools and databases that adhere to prescribed rules of geometry, form, function and format as well as prevailing aspect ratios consistent with digital images, photographic papers and printers.

The adherence to these rules makes it possible for even a novice computer user, equipped with a ubiquitous word-processing application-software (e.g., Microsoft Word), to construct a pleasing professional-quality photo album page that incorporates the user's own personal creativity. This can be done with any reasonable number of digital images (or any other graphical representation in digital form) and with user-defined or user-selected companion text that helps describe, document, or otherwise journal the people, places, and events captured in the images.

In one embodiment, the present invention incorporates the aforementioned geometrical rules, keys on the number and formats of the photos selected by the user for a given photo album page, and builds on a multiplicity of background and layout-configuration templates with a copy-and-paste methodology. In accordance with the principles of the present invention, the user need not re-position, size or re-size, crop, or otherwise adjust the dimensions of a single photo. In general, the ease with which the user can insert photos in a selected template is analogous to inserting photos into a conventional vinyl-sleeve album. This ease and speed of use allows the user, in just a matter of minutes, to completely re-do a given album page in pursuit of a better or otherwise different artistic combination of backgrounds and borders that might better complement the photos in a given photo album page.

Prior to describing details of the present invention, it should be noted that use of the term photo album page should not be construed as limiting the present invention. The term photo album page is used to generically describe a photo collage or any other collection of graphical elements that incorporates one or more photos.

Figure 1:
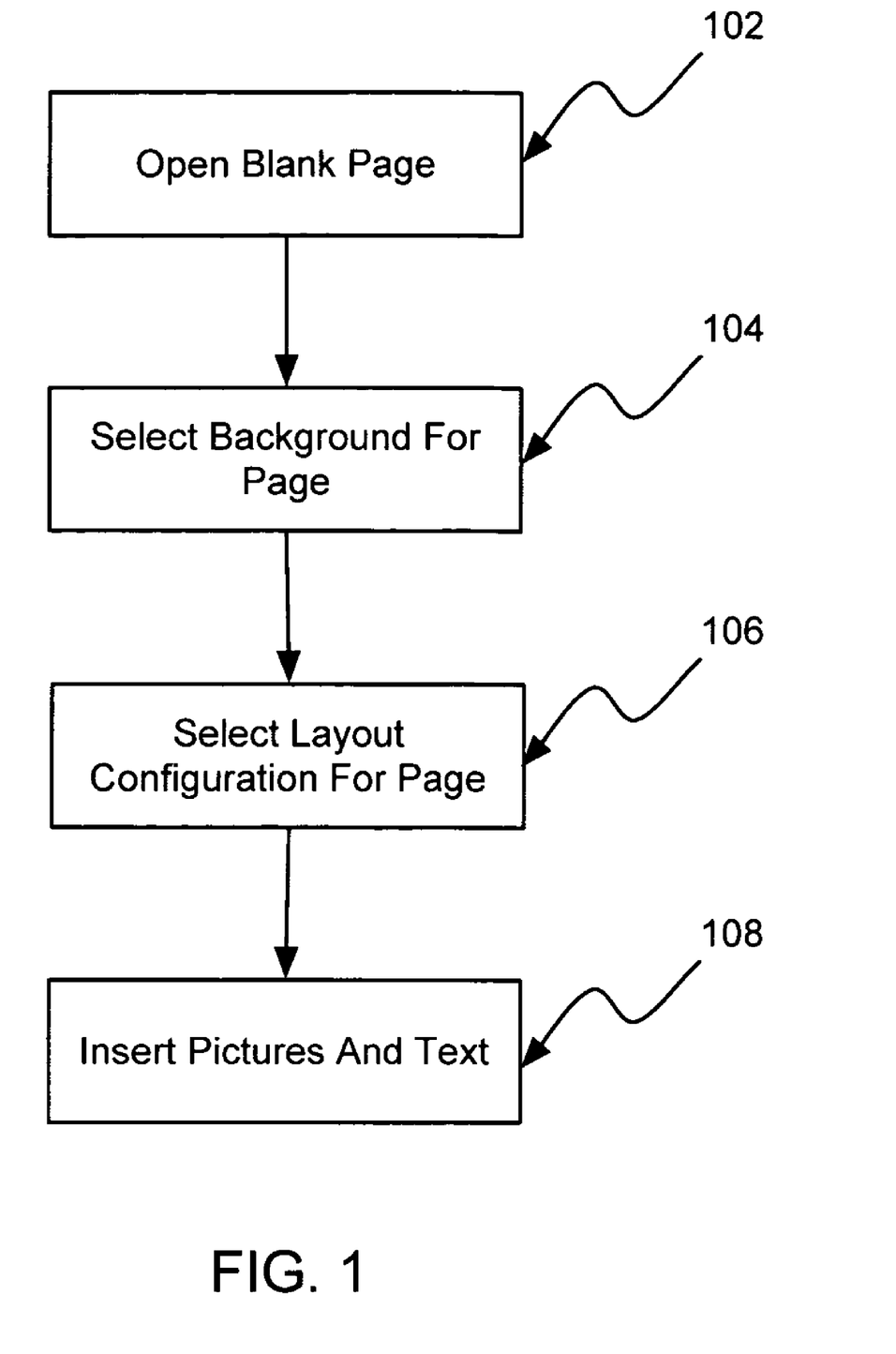
FIG. 1 illustrates a flowchart of a process of creating a page including graphical images, text, picture configurations, and backgrounds.

To illustrate the various aspects of the present invention, reference is made to the flowchart of FIG. 1, which illustrates the basic steps by which a user can create a photo album page. The process begins at step 102 where the user begins with a blank page. In various embodiments, this blank page can be represented as part of a larger collection of pages or as a single stand-alone page.

For example, consider an embodiment that is based on a word processing program such as Microsoft Word. In this embodiment, the blank page can appear as a new page within a multi-page word processing document or as a whole new document itself. Either scenario would be acceptable in its familiarity with the user.

Here, it should be noted that leveraging the functions of a word processing program can provide distinct advantages. First, due to the ubiquitous nature of word processing programs such as Microsoft Word, a huge installed base of users can be leveraged. This base of users need not learn new skills as they have already developed a deep-rooted familiarity with the basic structure and workflow of the word processing program. Second, the ubiquitous nature of the word processing program reduces the requirements for the software to be installed on the user's computer. As the bulk of the program elements are already pre-existent on the user's computer, only a relatively light weight software install would be required. In general, these advantages can often be in sharp contrast to conventional stand-alone software programs that are dedicated to photo album page creation.

Once the user is presented with a blank page, the process then continues at step 104, where the user selects or otherwise generates a background for the new album page. In one embodiment, the background can be represented by a generic item such as a solid, blend, texture, pattern, mosaic, etc. In another embodiment, the background can be represented by a theme specific item such as an image relating to sports or celebrations/events such as birthdays, anniversaries, graduation, holidays, seasons, leisure, etc. In general, the background can be represented by any item that would be desirable to include in the portions of the album page that are not obscured in some manner by the photos on the album page.

Figure 2:
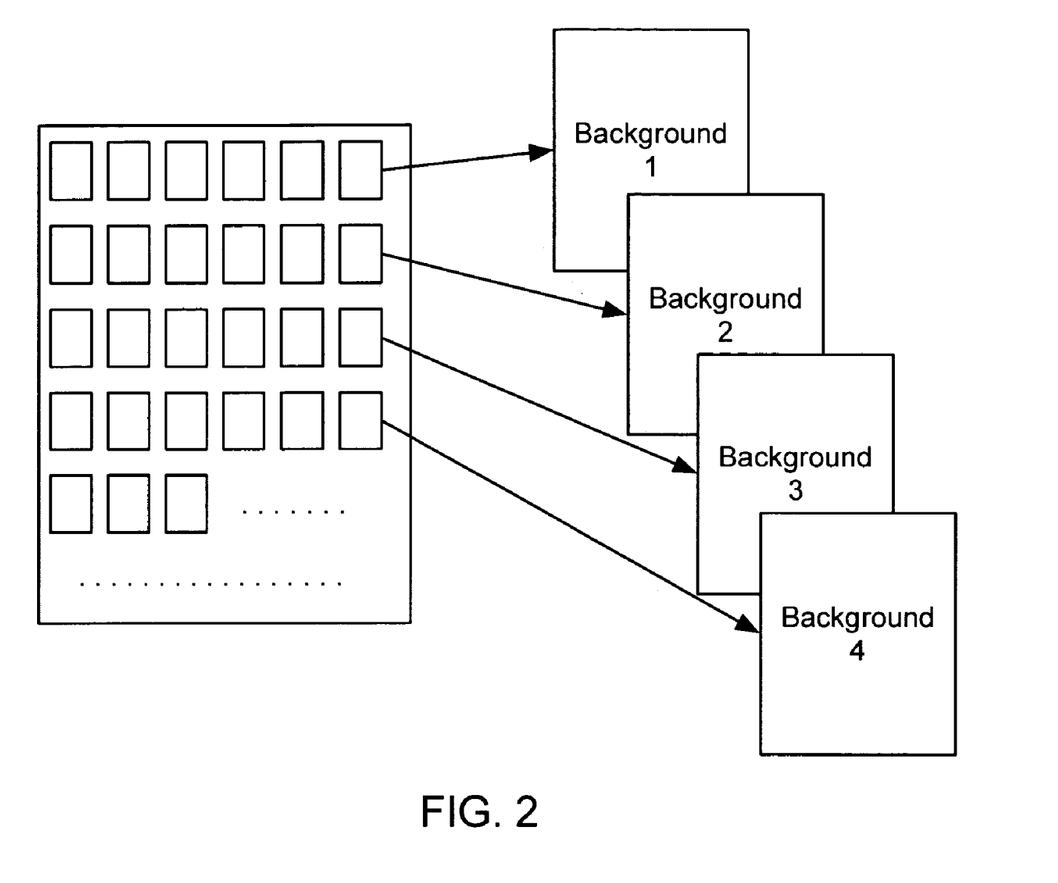
FIG. 2 illustrates an embodiment of a portion of a user interface for selection of a background.

In one embodiment, the user selects from a plurality of potential backgrounds that can be presented to the user as a collection of thumbnail images. FIG. 2 illustrates an example of a portion of a graphical user interface that can be used to provide the user with various background selections. Here, these thumbnail images can represent specific background elements that are stored in a database (or any general digital library) as image files (e.g., JPEG), word processing files (e.g., DOC files in Microsoft Word), or files in any other format suitable for retrieval by the image-editing program.

As would be appreciated, the specific user interface used to transfer the selected background to the album page would be implementation dependent. In one embodiment, the simple selection of a particular thumbnail would be sufficient to load the data from a background file in the library onto the album page. In other embodiments, the user can be invited to drag-and-drop, copy-and-paste, or perform any other action that would be intuitively recognized by the user as accomplishing the desired function of association.

After the background for the image is applied to the blank page, the user then proceeds to step 106, where a layout configuration for the album page is selected. In general, the layout configuration can be used to define the relative positions of images, text, or any other graphical elements that would be desirable to be included on the album page. As would be appreciated, multiple layout configurations can also be defined for specific groupings of graphical elements to thereby achieve an increased level of granularity and inherent control.

In one embodiment, the layout configuration is used to define the relative locations of images and text. Within this framework, a collection of layout configurations can be predefined that would cover the range of possibilities that would be considered desirable to the user. This collection of layout configurations would be stored in a database (or library) of configuration files.

Here, it should be noted that, in one embodiment, the layout configurations are stored in a separate database as compared to the database of backgrounds. In one sense, this separation between the layout configuration and background databases is illustrative of an element of artistic control desired by most users. In general, the desirability of the layout configurations would often be determined independently of the background selection. While it would be the case that some backgrounds would complement certain layout configurations or a certain subset of photos, the separation of the two design elements provides increased functionality, flexibility and creativity to the user. This increased functionality is primarily evident in the editing phase where the user can modify a background/layout configuration combination by changing one or more of the design elements.

Figure 3:
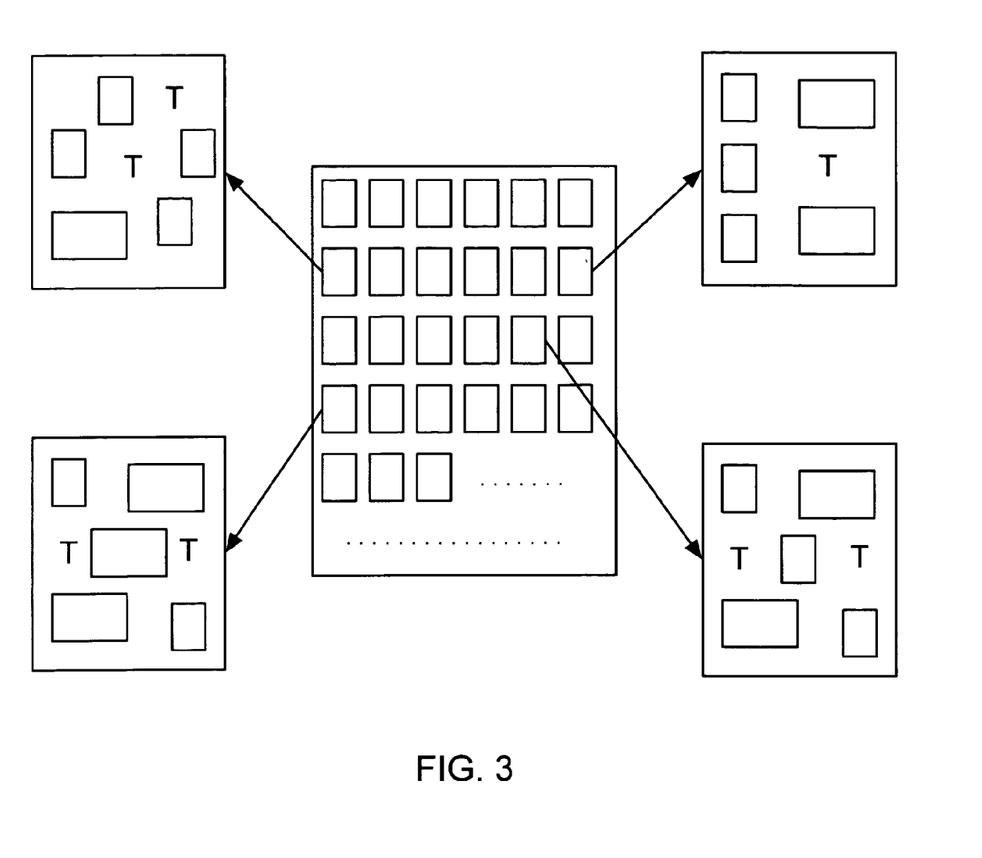
FIG. 3 illustrates an embodiment of a portion of a user interface for selection of a layout configuration.

FIG. 3 illustrates an example of a portion of a graphical user interface that can be used to provide the user with various layout configuration selections. Here, these thumbnail images can represent specific layout configurations that are stored in a database (or any general digital library). As illustrated in FIG. 3, the collection of layout configurations that are presented to the user include four layout configurations that deal with various permutations of five images and associated text. In one embodiment, the layout configurations can be defined based on consideration of industry standard aspect ratios of photo images (e.g., 640×480, 1024×768, 1260×980, etc.). This consideration would seek to minimize the need for moving, re-sizing, or cropping of images in the page layout.

By presenting the user with a variety of layout configurations, the user can quickly scan the included selections and select the one that seems appropriate. The need for individual placement, movement, and adjustments of individual graphical elements would thereby be averted.

In general, it should be noted that the collection of layout configurations can also be presented to the user in a structured hierarchical manner. This organized presentation would enable the user to navigate through a greater number of potential layout configurations as the user quickly and intuitively drills down to the particular layout configuration that meets his/her needs. For example, a structured hierarchy can be defined based on the number of photos, the orientation of the photos (e.g., portrait or landscape mode), the size of the photos, or any other element of categorization that would be recognizable to the user.

It should also be noted that the specific content and format of the layout configurations would be implementation dependent. In one embodiment that is based on a word processing program such as Microsoft Word, the layout configurations can be stored as independent word processing files (e.g., DOC files) that define the configuration elements. Here, each file can, for example, include placeholders for the photo images and text.

Alternatively, of course, a single master configuration file can be used to store the configuration elements for all layout configurations. The master file could then be accessed when the particular layout configuration needs to be generated for application to the album page.

Once the particular layout configuration is selected, it can then be applied to the album page. This application can be an iterative process (i.e., repeating of steps 102 and/or 104) as the ultimate desirability of the layout configuration can often be determined only in association with the background. For example, a particular generic background featuring an asymmetric pattern may seem desirable only in association with a complementing asymmetric layout configuration.

As would be appreciated, the specific user interface used to transfer the selected layout configuration to the album page would be implementation dependent. In one embodiment, the simple selection of a particular thumbnail would be sufficient to load a particular layout configuration stored in a layout configuration database onto the album page. In other embodiments, the user can be invited to drag-and-drop, copy-and-paste, or perform any other action that would be intuitively recognized by the user as accomplishing the desired function.

After the background and layout configurations have been selected, the user then proceeds to step 108, where pictures and text are inserted into the album page. In contrast to conventional album creation solutions, this process can proceed quickly due to the existing application of a layout configuration onto the album page. With existing placeholders evident on the album page, the process at step 108 can simply require the association of images and text to the existing placeholders.

For image files (e.g., photos or clip art), this process can be designed to proceed with the aid of a user interface similar to those illustrated in FIGS. 2 and 3. Here, a library of photos and/or clip art images would be accessed and corresponding thumbnail images displayed. The user can then select the desired image or group of images that would be applied to the particular album page. Where individual images are selected, manual association of images and placeholders can be invoked using various selection, drag-and-drop, and copy-and-paste techniques. Where a group of images are selected, an automatic association routine can be invoked. Movement of pictures between the locations can then be effected to modify inaccuracies in the automatic associations.

In one embodiment, the process of associating images to a layout configuration includes the automatic sizing of a picture relative to a picture border. Various picture border options can be included to represent a desired set of conventional framing styles (e.g., double matting). The process of automatically sizing a picture relative to the picture border can be performed in various ways. In one embodiment, the formats of the image and the image place-holder are matched, and the size, geometry, and location of the image place-holder dominates. In other words, no matter how big/small the image, it is perfectly fit within the defined bounds of the image place-holder. In effect, what you see is what you get. If the formats do not match, then the place-holder locks the horizontal dimension (of its geometry) and automatically adjusts the vertical dimension to accommodate the mismatched image format. The result may still be acceptable to the user and be allowed to stand as automatically accommodated. If the result is too big/small or somehow visually incompatible with the rest of the album page components, then the user can easily re-size the result (e.g., by "grabbing" the corner), maintaining the required image aspect ratio constant. Further, the user can drag the "final" image placeholder with its image to a more accommodating location on the page.

After the process of step 108 is completed, the user is now presented with an album page that is suitable for printing or publishing. Prior to printing or publishing, however, the user can also decide to exercise a "what if" modification of any given album page in pursuit of a "better" or different artistic presentation of the same photo set.

In accordance with the present invention, this process is equally easy and fast. In one embodiment, the "what if" scenario can be enabled through the simultaneous display of a second candidate page, which can be based on a duplicate of a selected album page. With this simultaneous display of candidate pages, the user can iteratively modify the two candidate pages and choose the desired combination of graphical elements based on a side-by-side comparison. See, for example, the illustration of FIG. 4. It is a feature of the present invention that the simultaneous display of candidate album pages enables a user to more discriminately determine the suitable combination of graphical elements on the album page. This discrimination is greatly aided by the user's ability to immediately see the comparative result of a change on one or more of the candidate pages. Side-by-side comparisons are particularly suitable when discriminating between fine issues of subjective taste.

Figure 4:
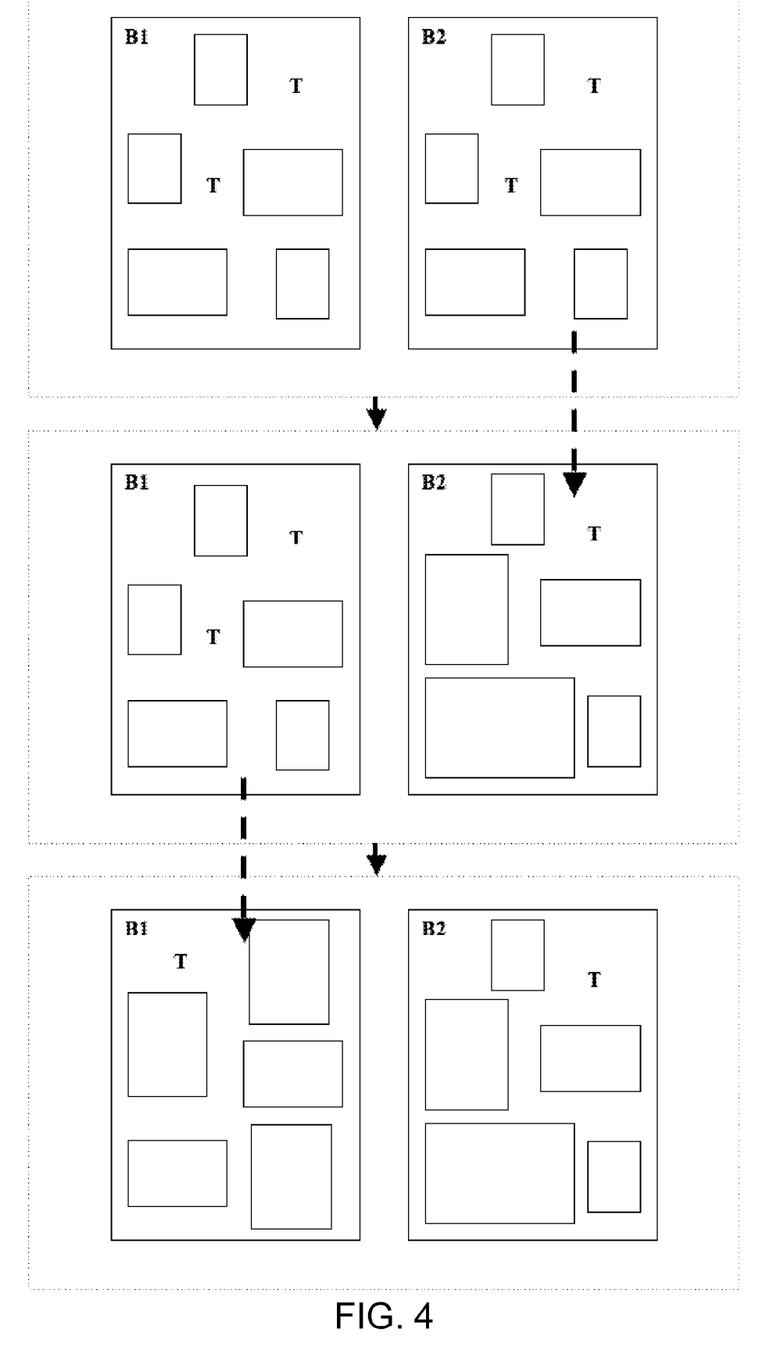
FIG. 4 illustrates an example of a user interface that enables editing of multiple candidate pages.
Figure 5:
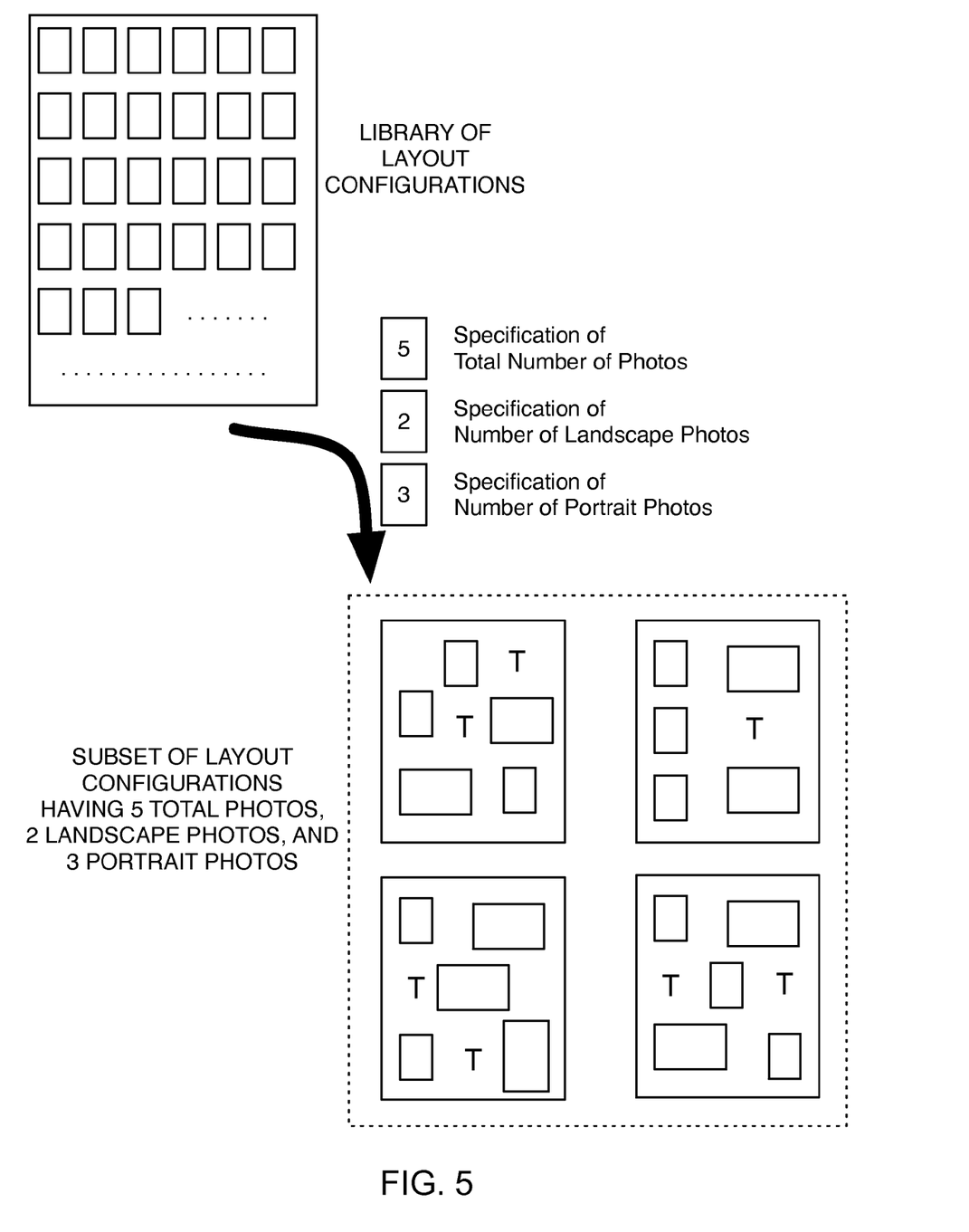
Figure 6:
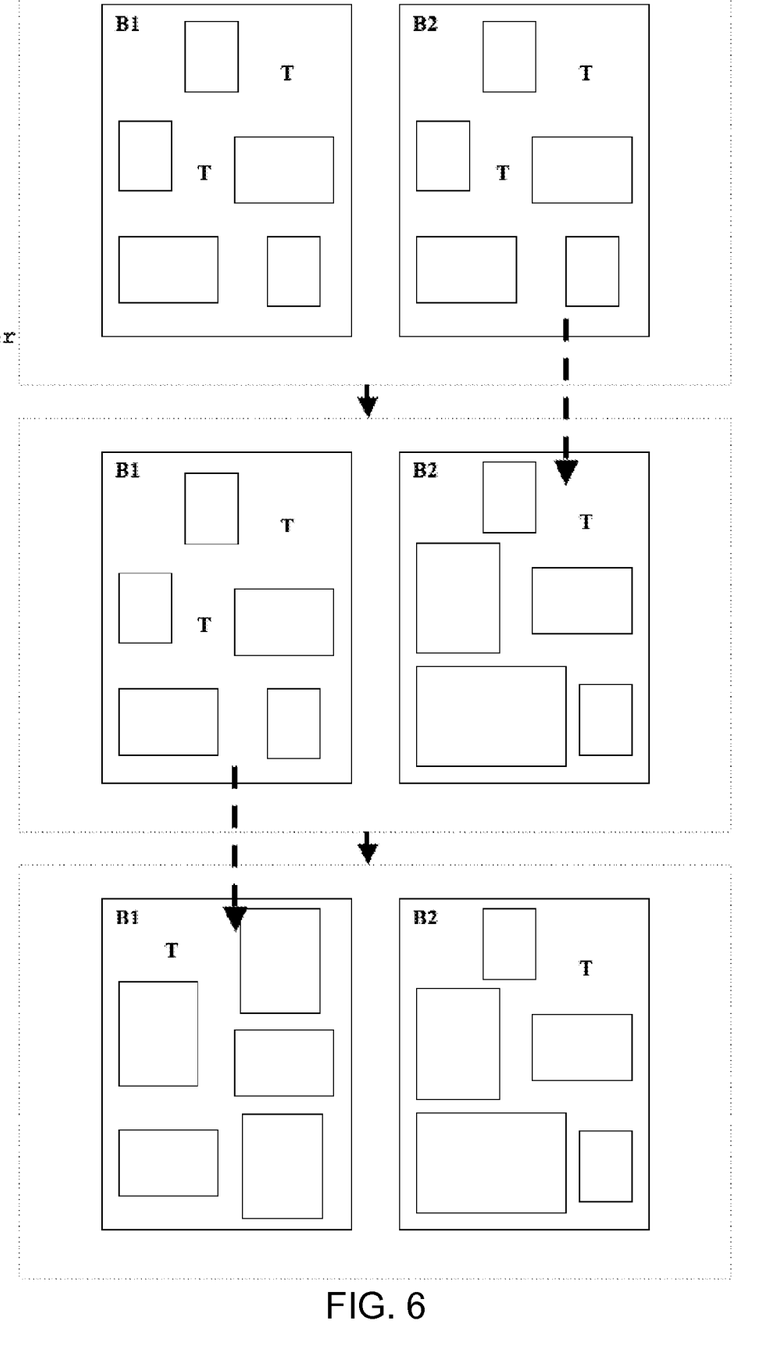

In an embodiment that is based on word processing program components, the candidate pages can be effected through the creation of a new document that includes a copy or variant of a selected page. Once the copy or variant is placed in the newly created document, the two candidate pages can be simultaneously viewed side-by-side.

At this point, the user can then choose to modify individual graphical components on the two candidate pages. For example, the user can modify the background on the first candidate page and modify the layout configuration on the second candidate page. Clearly, the user is permitted to perform any amount of modifications on any of the two pages, being constrained only to the degree that the user intends to compare pages with similar graphical compositions. If the user intends to compare two highly variant designs, then no constraints in the amount of modifications would be apparent.

Regardless of the amount of modifications selected by the user, the side-by-side comparison enables effective decision making through a clear understanding of the differences between two candidate designs. Clarity abounds through the simultaneous display.

Once the desired graphical combination is selected, the unselected candidate can be deleted simply through the closing of the document. Again, it is worth noting that these functions are all familiar to the user who is familiar with the conventional functions of a word processing program. The limited learning curve leads to increased confidence and a lower barrier to product adoption and competency development.

One benefit of leveraging the installed base of software and users is the ability to further leverage complementary functions in a word processing environment. For example, in one embodiment, features of the word processing program such as image editing, image sizing, border definition, font control, print control, etc. can all be included with minimal product development and subsequent training of the adopting users. All of these features and learning accrue to a new graphical editing application.

As would be appreciated, the "what if" scenario can also be applied to more than two candidate designs. Indeed no limitation on the number of album page duplications would be envisioned beyond the likely limitations of the permissible screen area of display.

It should also be noted that the description of the editing process for a candidate page should not be construed as limiting the scope of the present invention. Indeed, it is contemplated that the side-by-side comparison of candidate pages can be applied to any graphical environment that seeks to examine viable alternatives. It is believed that an application of significant effectiveness would reside in those contexts where discrete combinations of graphical elements (e.g., background, layout configuration, etc.) can be quickly swapped.

Although the above description may contain specific details, they should not be construed as limiting the claims in any way. Other configurations of the described embodiments of the invention are part of the scope of this invention. However, the invention may have applicability in a variety of environments. Therefore, the invention is not limited to any particular application. Accordingly, the appended claims and their legal equivalents only should define the invention, rather than any specific examples given.

What is claimed is:

1. A method for editing a photo album page amongst a collection of a plurality of photo album pages, comprising:

displaying, in a first window on a computer screen, a first photo album page from among the plurality of photo album pages, wherein said first photo album page in said first window includes a group of photos;

upon receipt of a user command, automatically producing a second photo album page based on said first photo album page and displaying, in a second window next to said first window on said computer screen, said second photo album page for side by side comparison of said first photo album page and said second photo album page, said second photo album page in said second window also including said group of photos, each of said first and second photo album pages having a layout and being capable of being independently modified by said user through manipulation of graphical elements in said first or second window on said computer screen, wherein said automatically producing and displaying occurs without direct user intervention by said user beyond provision of said user command;

receiving first user input in one of said first or second window on said computer screen that modifies part of either said first or second photo album page, wherein said modification enables said user to contrast said first and second photo album pages; and receiving second user input that selects one of said first and second photo album pages for inclusion in said plurality of photo album pages.

2. The method of claim 1, wherein said first photo album page includes a background pattern and text.

3. The method of claim 2, wherein said receiving first user input comprises receiving instructions by said user to change an aspect of a background pattern or a layout on one of said first and second photo album pages.

4. The method of claim 1, wherein said first and second photo album pages are word processor pages.

5. The method of claim 1, further comprising deleting a photo album page that has not been selected.

* * * * *